United States Patent [19]

Johnson, Jr.

[11] 4,451,858
[45] May 29, 1984

[54] ANALOG RECORDING SYSTEM

[75] Inventor: Clark E. Johnson, Jr., Minneapolis, Minn.

[73] Assignee: Vertimag Systems Corporation, Minneapolis, Minn.

[21] Appl. No.: 339,987

[22] Filed: Jan. 18, 1982

Related U.S. Application Data

[63] Continuation-in-part of Ser. No. 233,181, Feb. 10, 1981, which is a continuation of Ser. No. 966,357, Dec. 4, 1978, abandoned.

[51] Int. Cl.³ .............................................. G11B 5/00
[52] U.S. Cl. .................................................... 360/32
[58] Field of Search .................................. 360/32, 119

[56] References Cited

U.S. PATENT DOCUMENTS

| | | | |
|---|---|---|---|
| 3,049,698 | 8/1962 | Thompson et al. | 360/42 |
| 3,174,141 | 3/1965 | Sullivan et al. | 360/32 |
| 3,185,775 | 5/1965 | Camras | 360/134 |
| 3,376,566 | 4/1968 | Coccagna | 360/41 |
| 3,651,280 | 3/1972 | Streckman | 360/32 |
| 3,840,890 | 10/1974 | Sonderland | 360/32 |
| 4,164,763 | 8/1979 | Briccetti et al. | 360/32 |
| 4,251,842 | 2/1981 | Iwasaki et al. | 360/119 |

*Primary Examiner*—Vincent P. Canney
*Attorney, Agent, or Firm*—Jacobs & Jacobs

[57] ABSTRACT

An arrangement for recording an analog signal onto magnetic tape in which the analog signal modulates a square wave bias field by moving the negative-going transition of the square wave so that the average of the positive portion and negative portion of the square wave, equals the instantaneous value of the analog signal. The period of the total square wave, is maintained constant. The analog signal is compared to a periodic triangular-shaped wave, in a comparator, and the output of the comparator becomes switched in polarity whenever the analog modulating signal is equal in value to the instantaneous value of the triangular wave. The point at which polarity is switched corresponds to an intersection of the analog signal superimposed on the triangular wave. The resultant modulated square wave is applied to a recording head.

8 Claims, 6 Drawing Figures

FIG. I
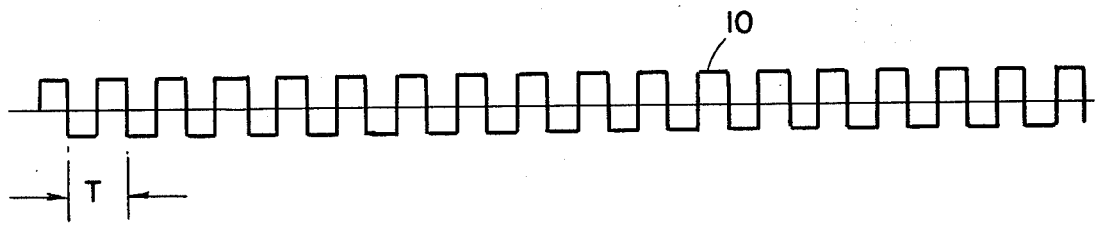
FIG. 2
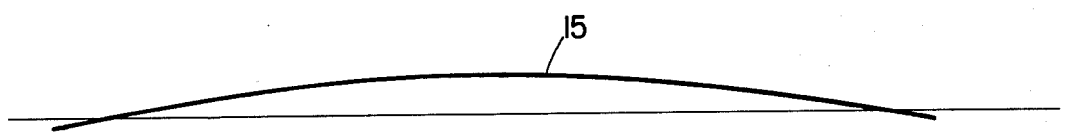
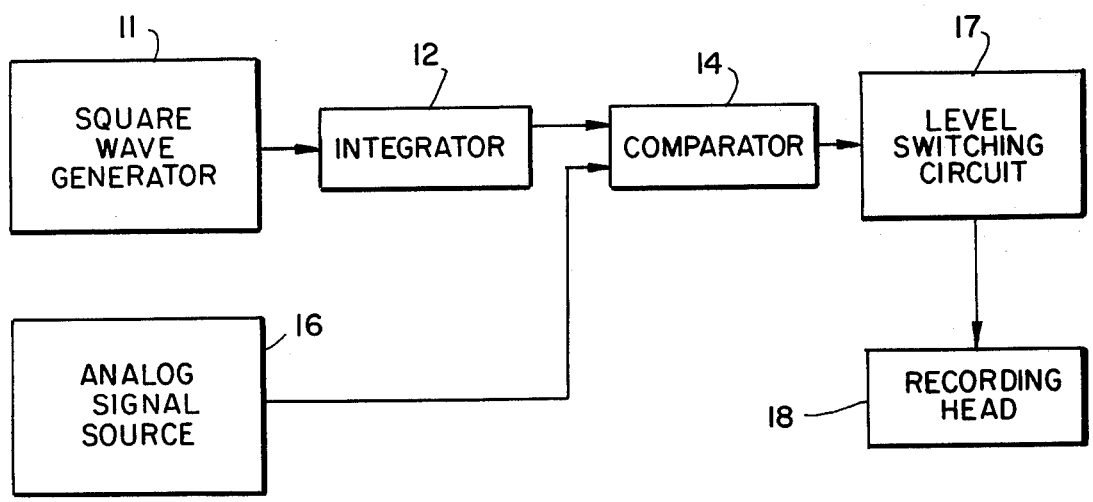
FIG. 4

4,451,858

ANALOG RECORDING SYSTEM

CROSS-REFERENCE TO RELATED APPLICATIONS

The present application is a continuation-in-part of my copending application Ser. No. 233,181 filed Feb. 10, 1981, which in turn, is a continuation of my then copending application, Ser. No. 966,350, filed Dec. 4, 1978, and now abandoned.

BACKGROUND OF THE INVENTION

In advancing the state-of-art in high performance magnetic recording systems, particularly high fidelity, the problem of fidelity has been approached on several fronts including improved magnetic materials in the tape. Thus, for example, chromium dioxide with its higher coercive force rather than gamma ferric oxide has been used, and lower noise electronics particularly the first stage after the playback head have also been used. Furthermore, various noise suppressing systems have been applied. One of these noise suppressing systems is widely used in high performance audio tape systems, and divides the audible signal into three bands and treats each of these independently, while reducing the system gain and thereby the background hiss if there is no signal in a particular band. This functions well and effectively increases the signal-to-noise ratio by as much as 10 db. One of the problems, however, is that special electronics equipment is needed both in record and playback in order to achieve the maximum noise reduction.

The magnetic recording process is essentially a non-linear process which is linearized by the use of high frequency a-c bias. This linearization is not completely effective, and takes place only over approximately 30 percent of the magnetization. Accordingly, the output from an analog signal is only about one-third of that from a digital signal in which the tape is fully saturated. This may be best understood by considering the character of the magnetic recording process, and that digital signals are fundamentally different in their requirements than analog signals.

Magnetic tape is made by coating on a flexible binder a layer of dispersed magnetic particles. These particles, which are generally acicular, are frequently either gamma ferric oxide or chromium dioxide. During the coating process the particles are caused to be aligned parallel to the direction of tape motion. Each of these little particles are single domain; that is, they can have only two states of magnetization, either positively magnetized or negatively magnetized in the long direction of the needle. No intermediate states are energetically possible. Now, since these particles have a range of volumes and length-to-diameter ratios, the amount of magnetic field it takes to switch their magnetization from one direction to the opposite direction varies. Accordingly, the hysteresis loop of the tape differs from the loop of a single particle. The tape hysteresis loop is an average of an agglomerate of particle loops.

In digital recording, the tape is magnetized with a large enough field to leave the tape in its saturated remanent state. Since in digital recording there is interest in only recording two states, 0 and 1, the tape need only be left in its two remanent states.

In audio recording, an entirely different situation prevails. Along with the analog signal to be recorded, a very high frequency bias field is used, which switches the particles in the record-head field many times while the tape passes across the head gap. As a given particle moves out of the head-field gap, it is left in its saturated state, but the effect of the entire agglomerate of particles in the tape is to leave the tape in a magnetic state proportional to the analog signal. In considering the anhysteretic magnetization curve for a-c bias analog recording, it will be noted that this curve which represents the transfer function between the analog record current and the playback voltage, is linear up to about 30 percent of the saturation remanance. Recording at levels above the linear range causes harmonic and intermodulation distortion. Accordingly, true high fidelity tape systems generally record only to about one-third of saturation.

The reason why only one-third of the available magnetic particles can be used, is very complex and involves the fact that when recording very high frequencies (as the tape attempts to do from the bias field), the net magnetization in the tape has a large vertical component. This vertical component does not contribute to the playback voltage (only the horizontal component of the magnetization does) but nevertheless uses up the magnetic moment of the tape. As a result of considerable research that has been carried out in this area, it was found that instead of trying to magnetize the tape horizontally, considerable improvement could be achieved if the tape is recorded vertically. This requires a fundamental change in both the structure of the magnetic recording head and the manufacture of the tape itself, since it is necessary to now use a magnetic material in the tape which is easily magnetized in the vertical rather than the horizontal direction. Thus, if particles are to be coated on the tape, they will have to be coated with their long axes perpendicular to the backing material rather than horizontal. For this purpose, experiments have been carried out in the use of sputtered chromium-cobalt films which can be formed with their easy axis perpendicular to the substrate. The results of such experiments on vertical recording have been exceptionally favorable. Instead of having the demagnetization effects of short wavelength recording being undesirable as in horizontal recording, these effects are beneficial in vertical recording. In such arrangements, moreover, the shorter the recorded wavelength, the less demagnetization losses occur.

Accordingly, it is an object of the present invention to provide an arrangement which uses a considerably larger fraction of the total magnetic moment in the tape in analog recording.

Another object of the present invention is to provide an arrangement of the foregoing character which is simple in construction and may be economically fabricated.

A further object of the present invention is to provide an arrangement, as described, which may be readily maintained in service and which has a substantially long operating life.

SUMMARY OF THE INVENTION

The objects of the present invention are achieved by providing an arrangement in which a high frequency squarewave bias is used instead of the conventional high frequency sinewave bias. The square wave bias field is modulated by the analog signal to be recorded. The modulation process is such that the negative-going transition of the square wave, is moved so that the average of the positive portion and negative portion of the square wave is made linearly proportional to the instantaneous value of the analog signal. The process is also carried out so that the period of the total squarewave, is held constant.

In accordance with the present invention, a comparator has one input to which a triangular-shaped wave is applied. The triangular-shaped wave may be derived from a squarewave by integrating the squarewave.

The comparator has a second input to which the analog modulating signal is applied. The output of the comparator is connected to a level switching circuit which switches in polarity the driving squarewaves applied to the recording head, when the modulating signal is equal in value to the triangular wave.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic diagram of a squarewave to be transformed into a triangular wave and then modulated, in accordance with the present invention;

FIG. 2 is a schematic diagram of the modulating analog signal;

FIG. 4 is a block diagram and shows the essential operating elements of the present invention and their interconnections.

DESCRIPTION OF THE PREFERRED EMBODIMENTS

Figure 3:
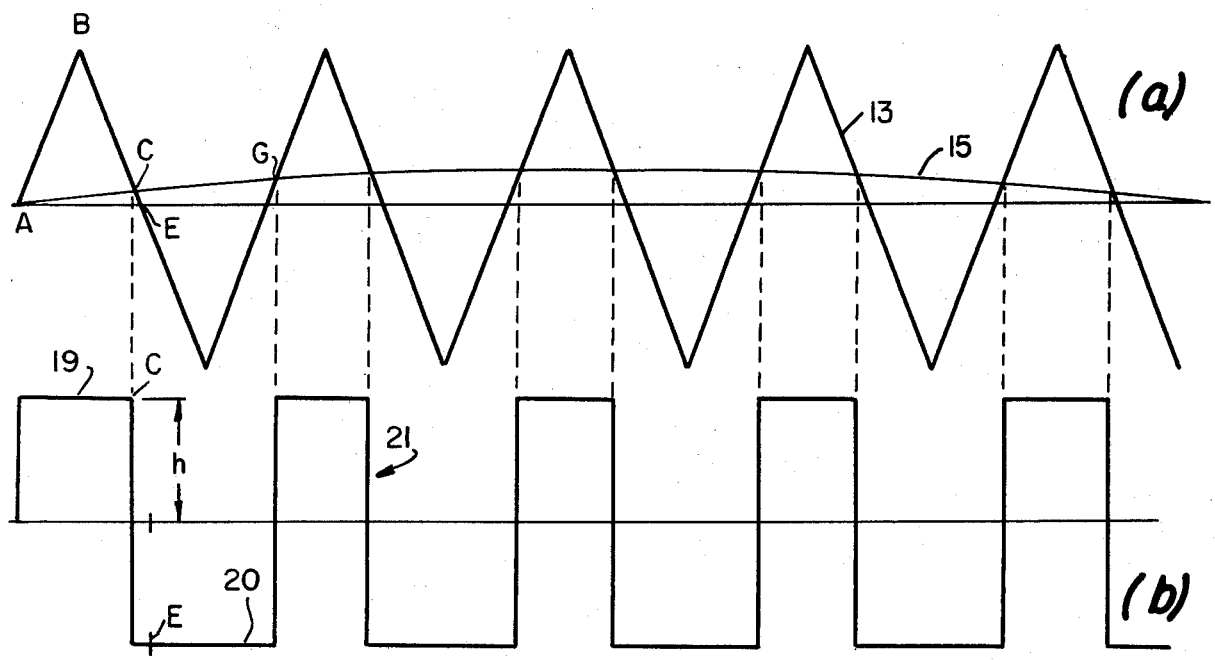
FIG. 3 consisting of a and b, is a graphical representation and shows the relationships of the triangular wave, the modulating signal, and the resulting modulated squarewave applied to the recording head.

In accordance with the present invention, a squarewave 10, shown in FIG. 1, is produced in the conventional manner by a squarewave generator 11. The output of the generator 11 is applied to an integrator 12 from which a triangular-shaped wave is obtained. The resultant triangular wave 13 (FIG. 3a) appearing at the output of the integrator 12 is applied to a comparator 14.

The analog signal 15 (FIG. 2) which may be derived from the source 16, is applied to the second input of the comparator 14.

The output of the comparator 14 is applied to a level switching circuit 17, which operates in a manner that can be seen by referring to FIG. 3a. Whenever the comparator produces an output indicative that the triangular wave exceeds, in value, the analog signal 15, the output of the switching circuit 17 provides a constant positive output 19, for example. The condition when the triangular wave exceeds the analog signal, may be seen in FIG. 3a, where in the first cycle of the triangular wave, it may be seen that starting from the point A and extending to the point C, the instantaneous values of the analog signal 15 are less than the instantaneous values of the triangular wave ABC. Continuing from the point C, the instantaneous values of the analog signal 15 are seen to exceed the values of the triangular wave, and this situation prevails until the point G. Within the region C-G, therefore, the output of the comparator 14 is opposite to the output prevailing within the region A-C. Correspondingly, whereas the level switching circuit 17 provides a positive output 19 within the region A-C, an opposite or negative polarity output level 20 is provided by the circuit 17 within the region C-G. This procedure is repeated cycle after cycle of the triangular wave, and the modulated squarewave 21 results therefrom. This modulated waveform 21 is then applied to drive the recording head 18. Level switching circuits such as the element 17 for providing outputs of opposite polarity depending on that of its input, for example, as well known in the art and for this reason are not described in further detail here. Schmitt trigger circuits, for example, may be used for this purpose. Level switching circuits of other design are also equally applicable.

Figure 5:
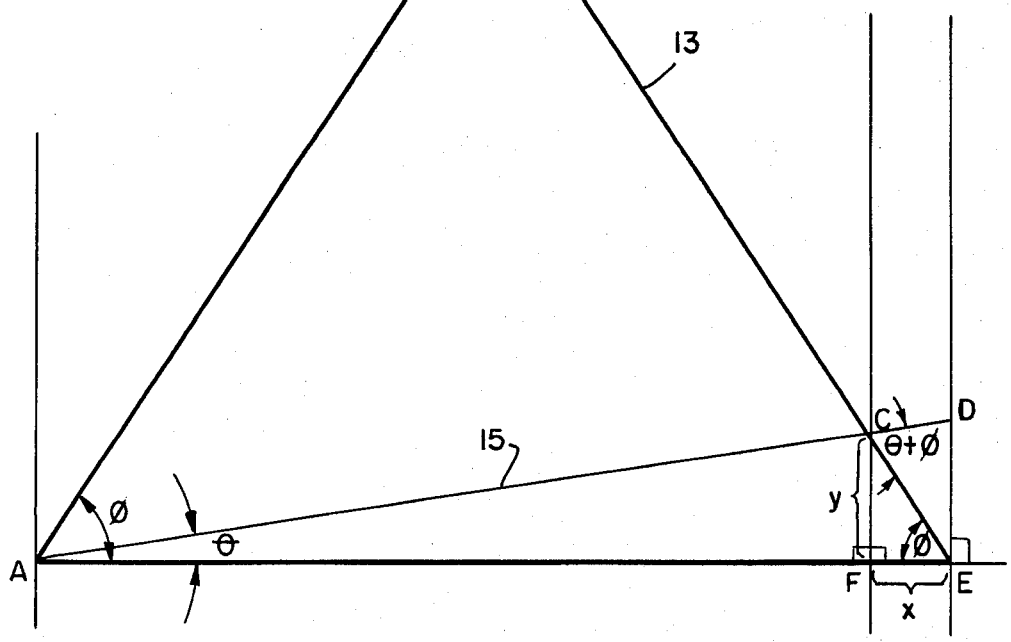
FIG. 5 is a graphical representation showing the geometric relationships between the triangular wave and the modulating signal.

The condition that modulation of a triangular wave in accordance with the present invention, results in the net area of the modulated squarewave being proportional to the instantaneous value of the analog signal, may be seen from the following analysis:

Referring to FIG. 5 there is shown a half-cycle of the triangular wave, and in particular, the first portion ABE. The analog signal over this interval is denoted by line AD. Since the triangular wave is a high frequency wave, the portion of the analog signal AD may be considered a straight line over this interval. Over the interval AF the triangular wave exceeds in value the analog signal, and as a result of the level switching circuit 17 provides a positive constant output level 19 over this interval. During the interval FE, the analog signal has values greater than the triangular wave, and accordingly, the level switching circuit 17 applies a constant negative output 20 to the recording head 18. These pulse levels may be seen in FIG. 3b. Over the interval AE, therefore, the net area of the positive portion and negative portion of the modulated squarewave, as derived from FIG. 3b is $$AFh - FEh \tag{1}$$

Now, since $$\begin{aligned} AFh &= AEh - FEh \\ &= K_1 - FEh \end{aligned} \tag{2}$$

$$\begin{aligned} \text{the net area} &= K_1 - FEh - FEh = K_1 - 2hFE \\ &= K_1 - K_oFE \end{aligned}$$

Accordingly, the net area is proportional to FE

The equation of line CE (FIG. 5) may be written in the form $$y = K_2 x = CF \tag{3}$$

From FIG. 5, it may be seen that the line CF is parallel to the base DE of the right triangle ADE. Hence, the base DE is proportional to the line CF, or $$DE = K_3 y = K_3 K_2 x \tag{4}$$

It may be seen from the above analysis, therefore, that the value DE of the analog signal is proportional to the interval x which is equal to FE. Consequently, the value of the analog signal DE is proportional to the net area of the positive and negative portions of the modulated squarewave, since the net area is proportional to FE.

The present invention includes the step of recording on the vertical recording medium, which has an easy axis of magnetization perpendicular to the surface of the tape, a plurality of squarewave cycles per length of tape equal to the playback head gap. Since, in vertical recording the tape is magnetized continuously and uniformly through the magnetic layer, in playback mode (which may be carried out with an ordinary playback head) the output is simply the average of the positive and negative portions of the recorded squarewave averaged over the length of the playback-head gap. Since there will be present a plurality (perhaps as many as ten) of squarewave cycles under the playback head gap at any one time, the output from the playback head will not contain any of the high frequency signal. Even if it did, it could be readily filtered out. Thus, the output from the playback head is the average of a plurality of cycles, and the signal to noise ratio is significantly increased.

Vertical recording has a limitation in that it is not at all usable for long wavelength recording. The distance between the transition should be no more than four or five times the coating thickness of the magnetic layer. Thus, an encoding algorithm is needed so that the width of each recorded area is held substantially small. Clearly, the ratio-modulated squarewave bias arrangement of the present invention solves that problem well, since the maximum width of the magnetized region is limited to approximately one wavelength of the bias field.

A particular advantage of the arrangement of the present invention is that the system noise will not increase by its use, but it will increase the signal by perhaps as much as 10 db. A 10-db or even 6 db increase in signal-to-noise ratio in audio systems can result in conventional electronic noise reduction systems becoming substantially obsolete. Such a system also allows the use of slower speed tape systems (since they are noise-limited as well as frequency-limited) and thus increase playing time. In accordance with the present invention, furthermore, a tape configuration different from the conventional one is used, since the easy axis of magnetization in the present invention is perpendicular to rather than parallel to the surface of the tape.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed:

1. A method for recording an analog signal, comprising generating a squarewave having positive and negative portions, said generating including a modulating of the squarewave by the analog signal with the average of the positive and negative portions of said squarewave being substantially proportional to the instantaneous value of said analog signal, and recording by vertical recording on magnetic tape having an easy axis of magnetization perpendicular to the surface of the tape a plurality of squarewave cycles per unit of recording tape equal to the length of the gap of a playback head means for playing back said magnetic tape, whereby the output of said playback head means is the average of a plurality of squarewave cycles under said gap at any time.

2. The method as defined in claim 1, wherein said squarewave is produced by generating a periodic triangular wave, comparing instantaneous values of the analog signal with the triangular wave and producing a modulated squarewave from said comparing step so that said squarewave has one continuous level when said triangular wave exceeds in value said analog signal, said squarewave having another continuous level when said analog signal exceeds in value said triangular wave.

3. A method as defined in claim 2, wherein said triangular wave is generated by integrating a squarewave.

4. A method as defined in claim 3, wherein the maximum width of a single magnetized region of the tape is limited to substantially one wavelength of the bias field.

5. Apparatus for recording an analog signal comprising: means for generating a squarewave having positive and negative portions, said generating means including means for modulating the durations of the positive and the negative portions with the average of said positive and said negative portions of said squarewave being substantially proportional to the instantaneous value of said analog signal, and recording means for recording by vertical recording on a magnetic tape having an easy axis of magnetization perpendicular to the surface of the tape a plurality of squarewave cycles per unit of recording tape equal to the length of the gap of a playback head means for playing back said magnetic tape, whereby the output of said playback head means is the average of a plurality of squarewave cycles under said gap at any time.

6. Apparatus for recording an analog signal comprising: means for generating a periodic triangular wave; means for comparing instantaneous values of the analog signal with the triangular wave, said comparing means being connected to a source of said analog signal and said triangular wave generating means; means connected to said comparing means for producing a modulated squarewave wherein the squarewave has one continuous level when said triangular wave exceeds in value said analog signal, said squarewave having another continuous level when said analog signal exceeds in value said triangular wave; and recording means for recording by vertical recording on magnetic tape having an easy axis of magnetization perpendicular to the surface of the tape a plurality of squarewave cycles per unit of recording tape equal to the length of the gap of a playback head means for recording said squarewave on a recording medium.

7. Apparatus as defined in claim 6, wherein said means for generating said triangular wave comprises squarewave generating means and integrating means connected to said squarewave generating means.

8. Apparatus as defined in claim 5, wherein the maximum width of the magnetized region is limited to substantially one wavelength of the bias field.

* * * * *